United States Patent
Rodriguez Rodriguez et al.

(10) Patent No.: US 8,183,724 B2
(45) Date of Patent: May 22, 2012

(54) COOLED ELECTRIC GENERATOR WITH TUBES EMBEDDED IN THE COVER THEREOF

(75) Inventors: Rafael Rodriguez Rodriguez, Reinosa (ES); Juan Manuel Sacristan San Martin, Zamudio (ES); Jaime Peredo Argos, Reinosa (ES); Jesús Macarro Ruano, Zamudio (ES)

(73) Assignee: Gamesa Innovation & Technology, S.L., Pamplona (Navarra) (ES)

( * ) Notice: Subject to any disclaimer, the term of this patent is extended or adjusted under 35 U.S.C. 154(b) by 239 days.

(21) Appl. No.: 12/373,590

(22) PCT Filed: Jul. 16, 2007

(86) PCT No.: PCT/ES2007/070133
§ 371 (c)(1),
(2), (4) Date: Jul. 14, 2009

(87) PCT Pub. No.: WO2008/009774
PCT Pub. Date: Jan. 24, 2008

(65) Prior Publication Data
US 2010/0013330 A1    Jan. 21, 2010

(30) Foreign Application Priority Data
Jul. 18, 2006    (ES) .................................. 200601908

(51) Int. Cl.
*H02K 9/00*    (2006.01)
(52) U.S. Cl. ................. 310/54; 310/58; 310/59
(58) Field of Classification Search .............. 310/52, 310/54, 57–59; H02K 9/14, 9/16, 9/18, 9/19
See application file for complete search history.

(56) References Cited

U.S. PATENT DOCUMENTS

| | | | | | |
|---|---|---|---|---|---|
| 2,887,062 | A | * | 5/1959 | Cametti et al. | 417/357 |
| 3,184,624 | A | * | 5/1965 | Solomon | 310/54 |
| 3,567,975 | A | * | 3/1971 | Biesack et al. | 310/54 |
| 4,386,289 | A | * | 5/1983 | Intichar et al. | 310/52 |
| 4,700,092 | A | * | 10/1987 | Bincoletto | 310/54 |
| 5,084,642 | A | * | 1/1992 | Katsuzawa et al. | 310/54 |
| 5,220,233 | A | * | 6/1993 | Birch et al. | 310/156.28 |
| 5,334,898 | A | * | 8/1994 | Skybyk | 310/268 |
| 5,798,587 | A | * | 8/1998 | Lee | 310/58 |
| 5,799,726 | A | * | 9/1998 | Frank | 165/156 |
| 5,859,482 | A | * | 1/1999 | Crowell et al. | 310/58 |
| 5,939,808 | A | * | 8/1999 | Adames | 310/89 |
| 6,016,015 | A | * | 1/2000 | Willard, Jr. | 290/55 |
| 6,396,190 | B1 | * | 5/2002 | Ahn et al. | 310/429 |
| 6,441,518 | B1 | * | 8/2002 | Yockey et al. | 310/58 |

(Continued)

FOREIGN PATENT DOCUMENTS
EP    0 984 548    3/2000
(Continued)

*Primary Examiner* — Quyen Leung
*Assistant Examiner* — Thomas Truong
(74) *Attorney, Agent, or Firm* — Ladas & Parry LLP

(57) ABSTRACT

A cooling electric generator with pipes embedded in its housing which includes mechanisms for generating electrical power from the motor torque provided by a wind turbine rotor, and with an external housing comprised of a cylindrical casing (23) and side shields (25) made of cast iron and have embedded conduits configured to form a refrigeration circuit (31, 41) for the generator with routes for entry and exit (33, 35, 43, 45) of the refrigeration liquid to and from the generator exterior. Preferably, the circuit (31) embedded in the cylindrical casing (23) has a helicoidal form and the circuits (41) embedded in the shields (25) have a spiral form.

4 Claims, 3 Drawing Sheets

U.S. PATENT DOCUMENTS

| | | | |
|---|---|---|---|
| 7,009,317 B2 * | 3/2006 | Cronin et al. | 310/54 |
| 7,155,916 B2 * | 1/2007 | Hobmeyr et al. | 62/7 |
| 7,591,147 B2 * | 9/2009 | Masoudipour et al. | 62/505 |
| 7,626,292 B2 * | 12/2009 | Baumann et al. | 310/54 |
| 7,737,584 B2 * | 6/2010 | Muller et al. | 310/52 |
| 7,737,585 B2 * | 6/2010 | Bahr et al. | 310/54 |
| 7,745,965 B2 * | 6/2010 | Oestreich | 310/54 |
| 7,800,259 B2 * | 9/2010 | Elgas et al. | 310/52 |
| 7,816,824 B2 * | 10/2010 | Jockel | 310/57 |
| 2003/0048031 A1 | 3/2003 | Dunlap et al. | |
| 2005/0235672 A1 * | 10/2005 | Hsu et al. | 62/259.2 |
| 2008/0100166 A1 * | 5/2008 | Stahlhut et al. | 310/156.32 |

FOREIGN PATENT DOCUMENTS

| | | |
|---|---|---|
| EP | 1 096 647 | 5/2001 |
| WO | WO 2007065762 A1 * | 6/2007 |

* cited by examiner

COOLED ELECTRIC GENERATOR WITH TUBES EMBEDDED IN THE COVER THEREOF

FIELD OF THE INVENTION

This invention refers to a cooling electrical generator with pipes embedded in its external housing and, in particular, to a wind turbine generator.

BACKGROUND

Currently, large generators and motors, and fundamentally, permanent magnet synchronous machines are cooled by water in a way that heat generated by the stator coil winding heads and by other copper and metal, etc. can be extracted from the air inside.

Decreasing the temperature of the air inside is essential for these enclosed machines, as their rotors have magnets with which the voltage and power developed by the machine are generated.

FIG. 1 shows one of the cooling systems which is currently most often used in an enclosed machine, which is the system known as "water jacket" 11, which, with the use of a series of grooves 13 made on the outer surface of the jacket, provides the circulation routes or channels for the refrigeration liquid, normally water. The "water jacket" 11 is fastened to the machine's outer housing 15 to complete the water circuit. Generally, the stator pack 17 with its coils 19 are placed inside the jacket 11 so that the source of the heat generation, which is the copper, is as close to the water as possible, in order to produce a thermal exchange by conduction, or by convection if there is any element capable of moving the internal air, or by radiation. FIG. 2 shows a "jacket" 11 with its channels 13 helicoidally arranged for water circulation.

Depending on the application, and fundamentally on the quality and properties of the refrigeration liquid which circulates through the "jacket", the jacket may or may not need to be made from stainless steel in order to prevent the corrosion of its internal channels as a result of the refrigerant liquid circulation.

Among the disadvantages of the refrigeration system just described, the following are worthy of mention:
  The need for said "jacket" to be made from stainless steel to prevent corrosion.
  The high cost of machining the "jacket" in order to create the aforementioned channels.
  The need for a closing element for the "jacket", which will act as the machine housing, in order to complete the refrigeration circuit.

This invention intends to resolve these issues.

SUMMARY OF THE INVENTION

This invention provides an electric generator which includes mechanisms for generating electrical power from the motor torque provided by a wind turbine rotor, and an external housing comprised of a cylindrical casing and side shields where at least one of said elements is made of cast iron and has an embedded conduit configured to form a refrigeration circuit for the generator with routes for the entry and exit of the refrigeration liquid to and from the generator exterior.

In a preferred embodiment both the casing and the shields are made from cast metal and have said refrigeration circuit embedded.

One advantage of this invention is that it reduces the cost of the generator as it eliminates the cost of machining the "jacket" channels of the previous invention.

Another advantage of this invention is that it reduces the number of parts by replacing the "water jacket" and the housing of the previous technique with one sole part.

Another advantage of this invention is that the generator casing can be made of cast iron which means a reduction in costs in comparison with the stainless steel "jackets".

Other characteristics and advantages of this invention become apparent in the following detailed description and the accompanying figures, which describe but are not limited to an example of an embodiment.

DETAILED DESCRIPTION OF THE INVENTION

Figure 1:
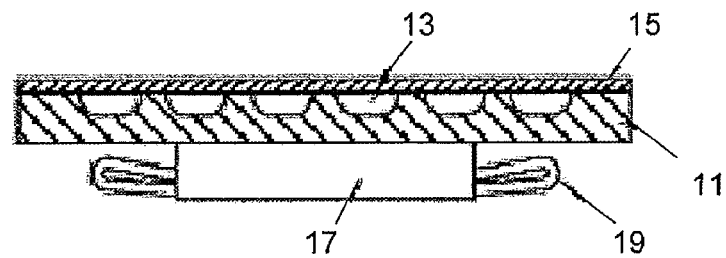
FIG. 1 is a partial section view of an electric generator with a known refrigeration system based on the "water jacket".
Figure 2:
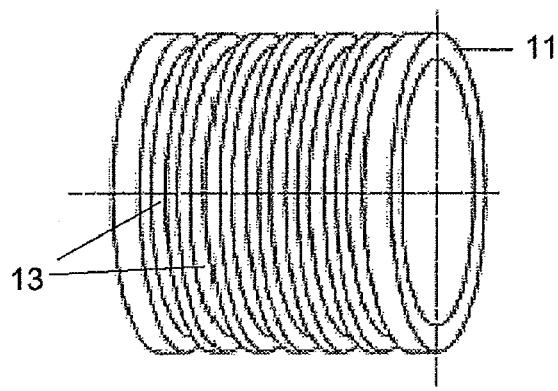
FIG. 2 is a perspective view of a "water jacket" known in the technique.
Figure 3:
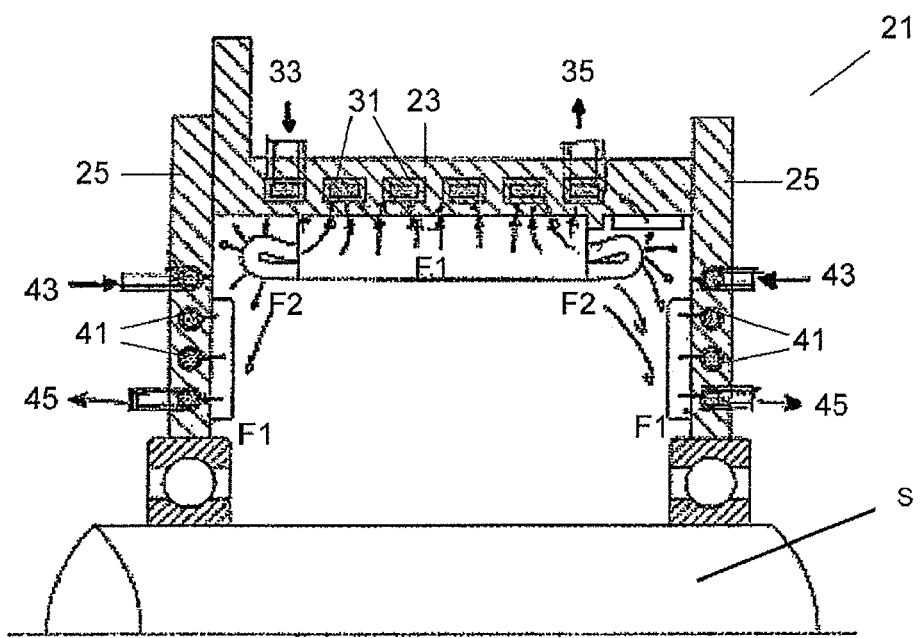
FIG. 3 is a partial section view of an electric generator according to this invention.
Figure 4:
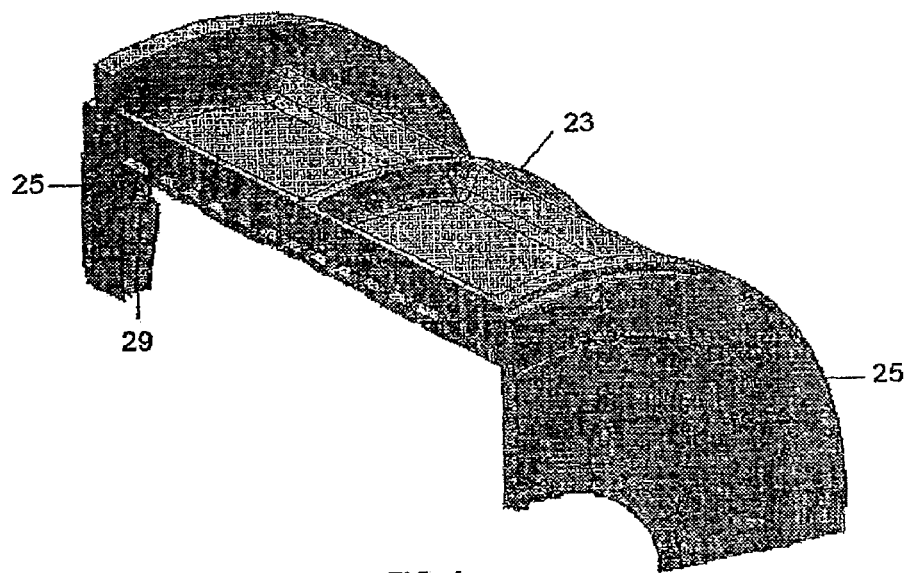
FIG. 4 is a partial perspective view of the housing of an electric generator according to this invention.
Figure 5A:
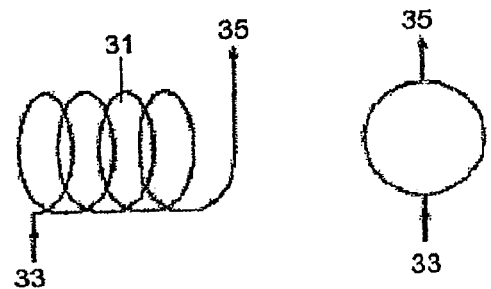
FIGS. 5a and 5b are, respectively, a side and front view of the refrigeration circuit embedded in the cylindrical casing.
Figure 5B:
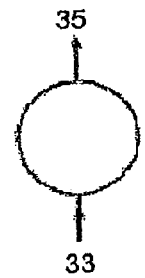
Figure 6A:
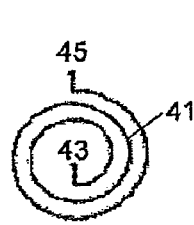
FIGS. 6a and 6b are, respectively, a side and front view of the refrigeration circuit embedded in a shield.
Figure 6B:
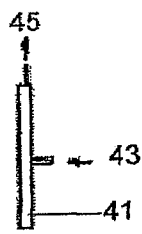

FIGS. 3 and 4 show an electric generator 21 according to this invention with a cylindrical casing 23 and two shields 25 forming its outer housing where a schematic view of the main forms of heat exchange are shown: F1 conduction flows and F2 radiation/convection flows.

Figure 7:
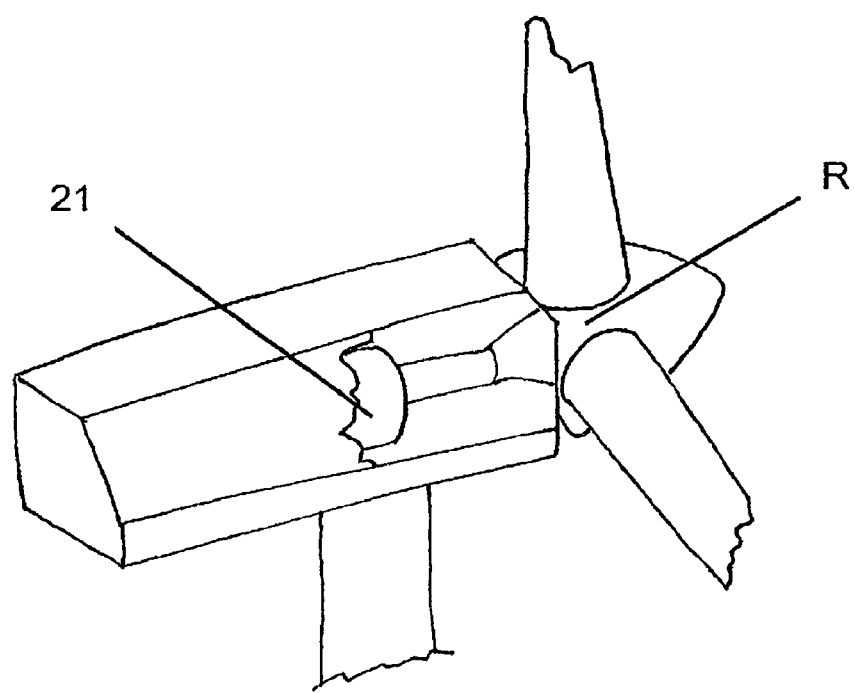
FIG. 7 is a perspective view of a wind turbine showing the connection between a wind turbine rotor and an electric generator.

The mechanisms, stator pack 17 and its coils 19, for generating electrical power from the motor torque provided by the wind turbine rotor (R) and transmitted by the shaft, are placed inside the cylindrical casing. (see FIG. 7)

Both the casing 23 and the shields 25 are made as cast iron unit parts with an embedded conduit configured in such as way that it acts as a refrigeration circuit for the generator with entry and exit routes for the refrigeration liquid to and from the exterior.

In order to favour heat exchange between the hot air inside the machine and the refrigerated areas, the shields 25 incorporate a series of fins 29 close to the machine's strategic areas which increase the contact surface area and therefore increase heat exchange by radiation and convection. Fins of this type may also be incorporated to the casing 23.

In a preferred embodiment of the invention, the refrigeration circuit 31 of the casing 23 has a helicoidal form with the entry 33 and exit 35 routes for the refrigeration liquid at either end and the refrigeration circuit 41 of the shields 25 has a spiral form with the entry 43 and exit 45 routes for the refrigeration liquid at its ends.

The conduit section of both circuits 41, 31 may be circular or rectangular (considering this to include square).

As the conduits which comprise the circuits 41, 31 are embedded in the casing 23 and the shields 25 this creates a perfect joint between the two elements thus greatly favouring heat transmission by conduction.

It is estimated that the percentage of heat to be evacuated by each external housing element is 40% for the casing 23 and 25% for each shield 25. Obviously said distribution depends on the configuration created by the machine designer, particularly on the options chosen in relation to the arrangement of ventilators to facilitate air movement inside the machine or the placement of fins to increase the refrigeration surface.

The reason for the percentage of evacuation from the casing 23 being lower than the sum of the evacuation percentages of the shields 25 is due to the fact that, as seen in FIG. 3, the heat which dissipates through the casing is mainly that of the stator pack, whilst the shields 25 will dissipate the heat from the coil heads, which are usually the hottest points of the electric machines. The heat of the coil head can be dissipated by ventilation thanks to ventilation fans which move the air surrounding the heads.

In a preferred embodiment of the invention, the circuit 31 of the casing 23 is formed with a rectangular sectioned conduit, which provides a larger contact surface area than if it were circular. The separation between the spirals of the helicoidal form will depend on the rigidity of the pipe and on the heat dissipation required. The method considered for manufacturing the helicoidal circuit is that of curving a pipe in a helicoidal form, compressing it in a press and welding on small plates to maintain the form.

In a preferred embodiment of the invention, the circuits 41 of the shields are formed by circular sectioned conduits, which are easier to shape that those of a rectangular section.

The preferred embodiments described attempt to optimise the ratio between thicknesses and contact surfaces for the refrigeration conduits on the casing 23 and the shields 25 whilst considering that the casing 23 is thicker than the shields 25 within the limits established to minimise the weight of the unit.

For the manufacture of the casing 23 with the embedded circuit 31 and also for the manufacture of the shields 25 with the embedded circuit 41, the method considered is that of a tube in the shape of the required circuit being placed in the mould where the molten cast iron for forming the casing 23 and the shield 25 is poured. Correct adherence between the pipe and the molten cast iron must be guaranteed to avoid imperfections, normal casting techniques will be used to do so.

The fusion temperature and thickness of the pipe must be sufficiently high to withstand damage from the molten cast iron. The fact that all perforations of the pipe must be prevented although it may lose some of its thickness must be taken into account, another factor to consider, in addition to the fusion temperature of the pipe, is the erosion and wear produced by the flow of molten cast iron at cast temperature and at the speed that it may have on each part of the tube. Therefore, the thickness of the pipe is considered to be very important, and will depend on the application for which it is designed and on all of the above.

Although this invention has been fully described in relation to its preferred embodiments, it is evident that any modifications which are included within the scope of the invention may also be included, thus the invention is not limited to said preferred embodiments, as per the following claims.

The invention claimed is:

1. An electric generator which includes mechanisms for generating electrical power from the motor torque provided by a wind turbine rotor, and an external housing comprised of a cylindrical casing (23) and side shields (25), wherein the cylindrical casing and the side shields of said external housing are made of cast iron with a plurality of embedded conduits configured to form a plurality of refrigeration circuits (31,41) for the generator with routes for entry and exit (33, 35; 43, 45) of refrigeration liquid to and from an exterior of the generator, wherein said plurality of refrigeration circuit conduits included a rectangular refrigeration conduit that helicoidally embedded in said cylindrical casing (23) with the entry and exit routes at the ends of the circuit.

2. The electric generator according to claim 1, wherein said plurality of refrigeration circuit conduits include a spiral refrigeration conduit (41) embedded in said shields (25) with the entry (43) and exit (45) routes at the end of the circuit.

3. The electric generator according to claim 1, wherein the refrigeration circuit (41) conduit of the shield (25) has a circular shaped section.

4. The electric generator according to claim 1, wherein the exterior housing incorporates fin (29) on the inside to increase contact surface area for heat exchange.

* * * * *